(12) United States Patent
Kimball et al.

(10) Patent No.: US 8,277,660 B2
(45) Date of Patent: Oct. 2, 2012

(54) METHOD AND APPARATUS FOR RECOVERY OF WATER CONTAINING SILICA

(75) Inventors: Robert J. Kimball, Helena, MT (US); Kenneth A. Klinko, San Diego, CA (US)

(73) Assignee: CDM Smith Inc, Boston, MA (US)

( * ) Notice: Subject to any disclaimer, the term of this patent is extended or adjusted under 35 U.S.C. 154(b) by 0 days.

(21) Appl. No.: 13/046,712

(22) Filed: Mar. 12, 2011

(65) Prior Publication Data

US 2011/0163031 A1 Jul. 7, 2011

Related U.S. Application Data

(62) Division of application No. 12/126,326, filed on May 23, 2008, now abandoned.

(60) Provisional application No. 60/940,386, filed on May 25, 2007.

(51) Int. Cl.
B01D 61/02 (2006.01)
B01D 61/04 (2006.01)
B01D 61/58 (2006.01)

(52) U.S. Cl. ........ 210/651; 210/650; 210/652; 210/660; 210/696

(58) Field of Classification Search .................. None
See application file for complete search history.

(56) References Cited

U.S. PATENT DOCUMENTS

| | | | |
|---|---|---|---|
| 4,277,344 A | 7/1981 | Cadotte | |
| 4,574,049 A | 3/1986 | Pittner | |
| 4,610,790 A | 9/1986 | Reti et al. | |
| 5,670,053 A | 9/1997 | Collentro et al. | |
| 5,811,012 A | 9/1998 | Tanabe et al. | |
| 5,925,255 A | 7/1999 | Mukhopadhyay | |
| 6,080,316 A | 7/2000 | Tonelli et al. | |
| 6,113,797 A | 9/2000 | Al-Samadi | |
| 6,258,278 B1 | 7/2001 | Tonelli et al. | |
| 6,267,891 B1 | 7/2001 | Tonelli et al. | |
| 6,303,037 B1 | 10/2001 | Tamura et al. | |
| 6,461,514 B1 | 10/2002 | Al-Samadi | |
| 6,537,456 B2 | 3/2003 | Mukhopadhyay | |
| 2002/0125191 A1 | 9/2002 | Mukhopadhyay | |
| 2003/0173296 A1* | 9/2003 | Costa et al. | .................. 210/639 |
| 2004/0188352 A1 | 9/2004 | Dey et al. | |
| 2006/0231491 A1 | 10/2006 | Mukhopadhyay | |
| 2007/0034571 A1 | 2/2007 | Costa | |

(Continued)

OTHER PUBLICATIONS

USPTO, Written Opinion of the International Searching Authority for related PCT Application No. PCT/US08/64925, to Kimball et al., mailed Sep. 29, 2008.

(Continued)

*Primary Examiner* — Krishnan S Menon
(74) *Attorney, Agent, or Firm* — John Brooks Law LLC; John J Brooks, III

(57) ABSTRACT

Disclosed are embodiments of a method and apparatus for the treatment of water containing silica in order to recover as much treated water from a water source as possible while minimizing the generation of waste products. Other embodiments include removing specific elements from the water source and utilizing those elements. Embodiments of the method and apparatus uses in-line physical and physiochemical treatment methods to remove potential biological, colloidal and hardness foulants continually so that there is minimal loss of water from the water source stream and minimal addition of chemicals to accomplish removal or reduction of these potential recovery-limiting foulants.

2 Claims, 11 Drawing Sheets

U.S. PATENT DOCUMENTS

2008/0230476 A1* 9/2008 Gilron et al. .............. 210/652

OTHER PUBLICATIONS

World Intellectual Property Organization International Bureau, International Publication with International Search Report for related PCT Application No. PCT/US08/64925, to Kimball et al., published Dec. 4, 2008.

USPTO, International Preliminary Report on Patentability, for related PCT Application No. PCT/US08/64925, to Kimball et al., completed Aug. 27, 2009.

* cited by examiner

Bench-Test RO Results

| Description | Feed Water | | Test Results | | | |
|---|---|---|---|---|---|---|
| | Raw Feed | Softened Feed | Low Pressure RO Perm (85% recy) | Low Pressure RO Reject (85% recy) | Final Permeate at 98% Recovery | Final Reject at 98% Recovery |
| Commons | | | | | | |
| pH | 8.1 | 7.5 | | 8.5 | 6.8 | 8.4 |
| Conductivity, microS/cm | 3,020 | | 37 | 15,000 | 57 | 57,400 |
| TDS (180 Deg C) | 1,970 | | 20 | 10,800 | 38 | 79,300 |
| Total Alkalinity | 1,700 | 1,600 | | 8,400 | 26 | 68,000 |
| Chloride | 18 | | | 90 | <1.0 | 825 |
| Fluoride | 3.3 | | | 20.2 | 0.2 | 175 |
| Sulfate | 138 | | | 908 | <1.0 | 7,290 |
| Nutrients | | | | | | |
| Nitrogen, Ammonia | 3.0 | 0.4 | <0.1 | 1.4 | <0.1 | 8.6 |
| Phosphorus, as P | 0.09 | | | 0.61 | <0.01 | 4.17 |
| TOC | <1.0 | | | 14 | <1.0 | 100 |
| Total Metals | | | | | | |
| Sodium | 836 | 808 | | 4,770 | 12 | 39,200 |
| Calcium | 7 | <1.0 | | 1 | <1.0 | 10 |
| Magnesium | 5 | <1.0 | | <1.0 | <1.0 | 1 |
| Manganese | <0.01 | <0.01 | | <0.01 | <0.01 | 0.02 |
| Potassium | 7 | 2.00 | | <1.0 | <1.0 | 8 |
| Barium | 0.4 | <0.1 | | <0.1 | <0.1 | <0.1 |
| Iron | 0.50 | 0.04 | | 0.30 | <0.03 | 0.32 |
| Strontium | 0.50 | <0.1 | | <0.1 | <0.1 | <0.1 |
| Silica | 11.20 | | <0.2 | 61.7 | <0.2 | 482 |

FIG. 5

METHOD AND APPARATUS FOR RECOVERY OF WATER CONTAINING SILICA

CROSS-REFERENCE TO RELATED APPLICATIONS

This application is a Divisional application of and claims benefit of co-pending U.S. patent application Ser. No. 12/126,326 to Kimball et al., filed May 23, 2008 entitled "METHOD AND APPARATUS FOR RECOVERY OF WATER CONTAINING SILICA" which is a nonprovisional application claiming benefit of U.S. Appl. No. 60/940,386 filed on May 25, 2007 and entitled "Method and Apparatus for Recovery of Water Containing Silica" the entire contents of all are herein incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to a method and apparatus for the treatment of water containing silica. More particularly, the invention relates to a method and apparatus to treat water utilizing a novel combination of pretreatment and reverse osmosis (RO) processes that result in a high percentage of treated water output while lowering the amount of chemical additions used in the process and lowering the amount of process waste.

2. Background of the Invention

Increasing demand for fresh water supplies has led to an increasing need to utilize brackish water sources. At the same time, industries extracting inland groundwater must meet strict limitations prior to discharging that water.

These brackish waters usually contain silica at concentrations that limit to the recovery of treated water for use or discharge. When these brackish waters are used as a water supply, it is beneficial to provide a treatment method that recovers as much treated water as possible. When brackish water sources are proposed for use or discharged as a by-product of an industrial process, the cost of disposal of the concentrated waste stream is a primary consideration, as the purification technologies employed all generate a waste stream. Maximizing the treated water and minimizing the waste stream are common goals of many treatment methods.

Depending on the treatment technology employed, the treated water quality desired and the location of the source and options for waste stream disposal, treatment methods such as ultra-violet (UV) oxidation, micron filtration (MF), ion exchange (IX), reverse osmosis (RO), evaporation and some combinations thereof have been employed.

One issue related to addressing current solutions to this problem is the volume of the waste stream being generated by the conventional treatment methods. Because the current processes are volumetrically inefficient, a significant waste stream is usually generated. Various disposal options for the waste stream exist. Disposal options are generally limited to (a) discharges to surface waters, (b) deep-well disposal, (c) discharges to existing wastewater treatment plants, or (d) natural or mechanical evaporation. All of these disposal options are either not feasible or are costly for reasons specific to that option. In (a) a suitable receiving water must be nearby and environmental regulations must be met. In (b) the availability and costs of the wells and transmission lines to a suitable well site meeting environmental regulations must be considered. In (c) existing wastewater facilities must be nearby and may require capacity increases or unit process modifications to handle the flows. In (d) the costs of evaporation can increase the cost of treated water significantly. Currently, individual treatment technologies are typically applied and the resulting processes either do not operate at high enough efficiency, or still result in a significant amount of concentrated liquid waste stream that must be disposed of.

As increased efficiencies have been pursued, solutions are available that create additional issues. For example, it is well understood that a major obstacle for increased water recovery utilizing RO solutions is the presence of silica in the water that creates scaling problems as its concentration increases through more efficient recovery processes. One solution meant to address the silica problem to date involves continuously using acid and/or caustic additions to adjust the natural pH of the process stream to reduce the risk of scaling and allow higher water recoveries. One such solution is disclosed by U.S. Pat. No. 5,925,255, Mukhopadhyay, filed Aug. 12, 1997, which is herein incorporated by reference in its entirety. The required addition of chemicals to the water treatment process increases the cost and complexity of this particular solution.

Solutions such as adding antiscalants to prevent precipitation of hardness ions and/or silica have also helped increase the recovery rate of some treatment processes. However, it has not been the general practice in the industry to operate RO systems on brackish water sources at greater than 90% recovery even with the addition of acid or an antiscalant/sequestriant because of the scaling potential risks, thus limiting the water sources that can be recovered.

Because of these issues and other reasons, the commercial viability of extremely high RO system recoveries where the concentration of solutes in the final reject is 10 to 100 times the water source stream therefore has not been established in practice.

Because the RO process concentrates and separates simultaneously, the common teachings in the art are to adjust pH of the feed stream to an RO system so that the ions, when concentrated by the process, remain in solution and prevent scaling of the membrane. The teaching is also that the water recovery of the RO system is limited by the ion solubility product (Ksp) of the sparingly soluble ion pairs in the system, and that reducing water recovery is a mitigating design response if pH adjustment is not sufficient. Given these challenges, chemical adjustment of the feed stream has been taught as the least expensive way to keep feed stream constituents in solution.

Consistent with these approaches, popular water treatment system modeling programs, such as those offered by Dow and Hydranautics, put an upper limit of 1.5 times silica solubility as the upper limit of an aggressive water treatment method. At 25° C., this represents a silica concentration of somewhere around 120-130 mg/L. In systems where silica is considered to be more than 1.5 times the solubility, lowering RO system recovery is recommended by the major membrane manufactures.

As water is becoming increasingly expensive, in short supply, or both, it is desirable to further increase the ratio of the recovered water stream to the water source stream treated by RO systems.

Therefore, there exists a need for a cost-effective water treatment process that operates at the highest efficiency of water recovery possible, maximizing the efficiencies of several processes to minimize the process waste stream volume and maximizes the treated water stream.

There also exists a need for a water treatment method that minimizes the scaling caused by the presence of silica in a water treatment process, which is often the limiting factor for high water recovery levels.

BRIEF SUMMARY OF THE INVENTION

It is an object of one embodiment of the invention to provide a method to remove elements from water comprising receiving a feed water from a water source, the feed water containing at least silica and hardness ions, ensuring the feed water has a Silt Density Index (SDI) of no more than 3 and polyvalent cations less than 5 mg/L as $CaCO_3$, introducing the feed water to a high pressure side of a high pressure Reverse Osmosis (RO) membrane system and pressurizing the feed water on the high pressure side of the high pressure RO membrane system to produce a permeate stream and a reject stream, the reject stream having a silica concentration of at least 140 mg/L.

It is a further object of one embodiment of the invention to receive water from the water source as a process stream and pretreat the process stream with an ion exchange (IX) softener to produce the feed water.

It is an object of one embodiment of the invention to provide a method wherein the IX softener is a strong acid cation (SAC) ion exchange resin system, a weak acid cation (WAC) ion exchange resin system, or both, operated at least partially in the sodium and the hydrogen form.

It is another object of one embodiment of the invention to provide a method wherein the method further includes the ensuing step further including receiving a water source stream from the water source as a process stream and pretreating the process stream with an ion exchange (IX) softener to create a first feed water, introducing the first feed water into a high pressure side of a low pressure RO membrane system, pressurizing the first feed water on the high pressure side of the low pressure RO membrane system to produce a first reject stream and a first permeate stream and introducing the first reject stream as the feed water to the high pressure side of the high pressure RO membrane system.

It is a further object of one embodiment of the invention to provide a method wherein the ensuring step further includes a combination of one or more of the following steps in any order: removing micro-colloidal material from the process stream with at least one micron filtration unit and exposing the process stream to Ultra-Violet (UV) lights.

It is an object of one embodiment of the invention to provide an apparatus to remove elements from a water, the apparatus comprising at least one high pressure RO membrane, a water source stream from a water source containing at least silica and hardness ions, a means to ensure a feed water from has a Silt Density Index (SDI) of no more than 3 and polyvalent cations less than 5 mg/L as $CaCO_3$ and a means to introduce the feed water to the high pressure side of the high pressure RO membrane whereby the RO membrane produces a permeate stream and a reject stream, the reject stream having a silica concentration of at least 140 mg/L.

It is another object of one embodiment of the invention to provide an apparatus wherein the means to ensure the feed water further includes an IX softener capable of pretreating the water source stream from the water source to create the feed water.

It is a further object of one embodiment of the invention to provide an apparatus wherein the IX softener is a strong acid cation (SAC) ion exchange resin system or a weak acid cation (WAC) ion exchange resin system, or both, capable of being operated at least partially in the sodium and hydrogen form.

It is an object of the one embodiment of the invention to provide an apparatus further including the means to ensure the feed water further includes an IX softener capable of pretreating the water source stream to create a process stream and a low pressure RO membrane system capable of receiving the process stream from the ensuring means as a first feed water and producing a first permeate stream and a first reject stream whereby the first reject stream is the feed water introduced to the high pressure side of the high pressure RO membrane system.

It is another object of one embodiment of the invention to provide an apparatus wherein the means to ensure the feed water characteristics further includes at least one micron filtration unit capable of removing micro-colloidal material from the process stream, at least one Ultra-Violet (UV) light capable of disinfecting the process stream and a means to add an antiscalant to at least one of the streams selected from the group consisting of the process stream and the first reject stream.

BRIEF DESCRIPTION OF THE SEVERAL VIEWS OF THE DRAWINGS

FIG. 5 shows a table of results from a Bench Test of one embodiment of the invention.

DETAILED DESCRIPTION OF THE INVENTION

Figure 1A:
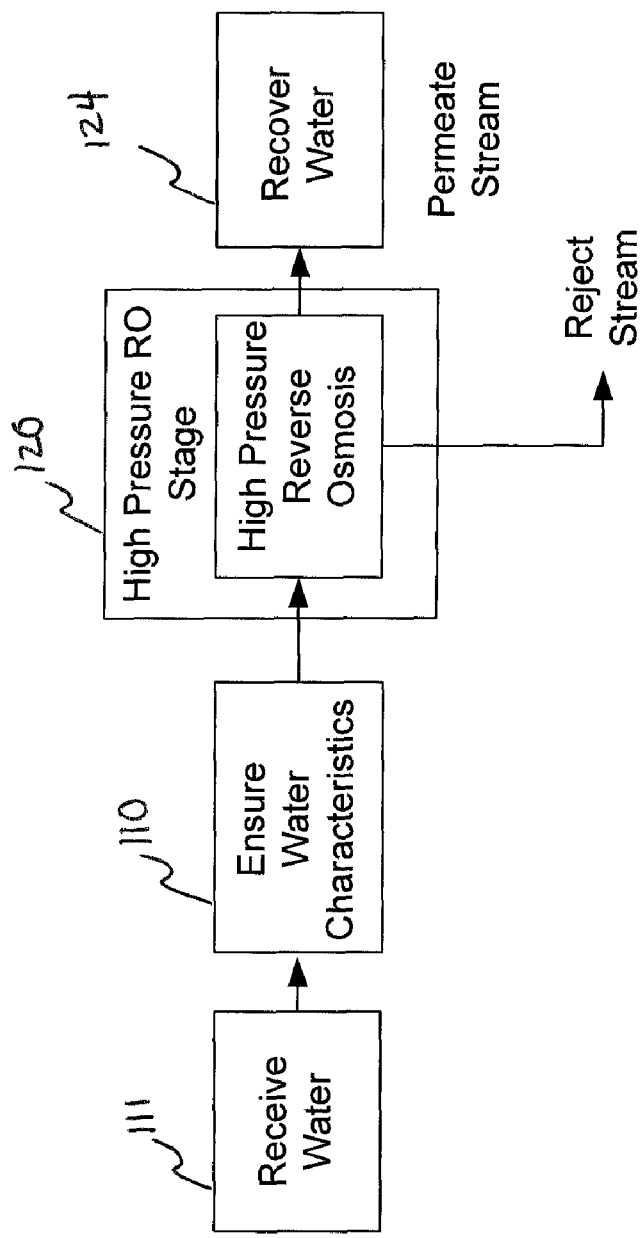
FIG. 1A shows a process flow diagram of one embodiment of the invention.

While this invention is capable of being implemented in many different embodiments, there is shown in the drawings, and will herein be described in detail, several specific embodiments, with the understanding that the present disclosure can be considered as an exemplification of the principals of the invention and is not intended to limit the invention to the embodiments illustrated. Therefore, it is understood that examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

Disclosed are embodiments of a method and apparatus for the treatment of water containing silica in order to recover as much treated water from the water source as possible while minimizing the generation of waste product. A typical application includes the treatment of water sources drawn from underground reservoirs containing one or more impurities such as salinity, colloids, hardness and biological materials. Other applications include but are not limited to water recovery and treatment of waters such as lakes, oceans, runoff, industrial processes, mining, well drilling and other applications involving water. Other embodiments include removing specific elements from the water source and utilizing those elements. This method and apparatus achieves these results without continuous acid or caustic addition to the water source or process stream. In order to accomplish that goal, process limitations have been removed through this method so that subsequent process steps can be operated at the maximum water recovery rate possible. The process uses in-line physical and physio-chemical treatment methods to remove potential biological, colloidal and hardness foulants continually so that there is minimal loss of water from the water source stream and minimal addition of chemicals to accomplish removal or reduction of these potential recovery-limiting foulants. In the embodiments described herein and preliminarily tested on a bench-scale, no continuous chemical additions except for a small amount of a silica-specific antiscalant/sequestriant which may be injected into the process stream.

For purposes of describing this invention, foulants are material that silica can co-precipitate or complex with, or polymerize with and foul the membranes of reverse osmosis (RO) systems.

For purposes of this description, the term silica means silicon dioxide.

For purposes of this description, the term silt density index (SDI) is defined as the results of tests to determine the fouling potential of water feeding a membrane filtration process. The test may be defined by the procedures of standard ASTM D-4189, which is herein incorporated by reference in its entirety, as well as other methods of testing the fouling potential of water the art of water filtration.

For purposes of this description, hardness is defined as all polyvalent cations including, but not limited to ions such as iron, calcium, magnesium, barium, strontium, aluminum, and manganese.

For purposes of this description, the percentage of water recovered from the system is defined as the volume of water coming from the method or apparatus divided by the volume of the water source stream. The water source stream represents the water and other elements received from the water source.

For purposes of this description, the term process stream is defined as the water stream that is received and processed by the methods and apparatus described in this description. The process stream includes, but is not limited to the water source stream and the process stream through the pretreatment stage For purposes of this description, the term feed water is defined as the water stream that is received by an RO membrane described within the high pressure RO stage as described herein.

For purposes of this description, total dissolved solids (TDS) is defined as the combined content of all inorganic and organic substances contained in a liquid which are present in a molecular, ionized or micro-granular suspended form.

For purposes of this description, the term element is defined as those foulants or other materials that are suspended or otherwise present in water and removed by the methods and apparatus described in this description. Elements include, but are not limited to bacteria, silt, silica and polyvalent cations.

One Embodiment of the Method:

One embodiment of the inventive method disclosed involves receiving a water source stream from a water source as a feed water stream to a high pressure RO process. In this embodiment, as shown in FIG. 1A, the characteristics of a water source stream is received as step 111 and ensured by step 110 to be a feed water having an SDI of no more than 3 and polyvalent cations less than 5 mg/L as $CaCO_3$. This feed water is introduced to a High Pressure RO Stage 120 comprising introducing the feed water to the high pressure side of a high pressure RO membrane system where the RO membrane system is capable of producing a reject stream with high concentrations of silica and a permeate stream comprising a high percentage of water. Step 124 is the recovery of water from the method disclosed.

Ensuring the feed stream has the characteristic of the feed water described above can be made by equipment measuring the characteristics of the feed water directly. It is also possible for the characteristics of the feed water to be known as a result of other processes, such as but not limited to the pretreatment methods discussed below, that create and/or measure the characteristics of water as output from those processes.

A water source capable of having the characteristics of the feed water is possible where hardness and silt have been removed from the water source stream. Examples of these types of feed water include, but are not limited to other softening systems in other water treatment systems or as by-products of industrial processes.

A water source stream capable of having the characteristics of the feed water described above is also possible where the water has become available without the presence of hardness or silt. Examples of these types of water source streams include, but are not limited to geothermal water sources.

Figure 1B:
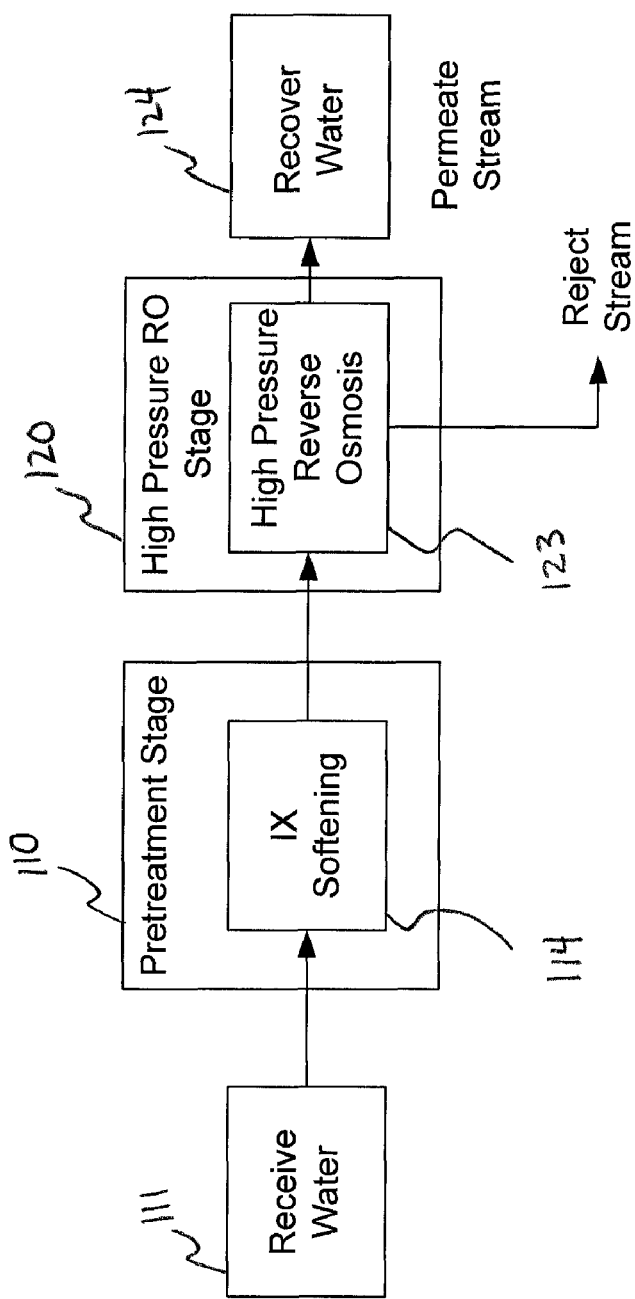
FIG. 1B shows a process flow diagram of one embodiment of the two stage method of this invention.

Another embodiment, shown in FIG. 1B illustrates a two stage embodiment of the present invention. The first of the two stages, the Pretreatment Stage 110, involves removing foulants and hardness from the water source stream that typically cause fouling and scaling in downstream RO membrane systems. This Pretreatment Stage ensures the characteristics of the feed water. These methods of removing potential biological, colloidal, organic, inorganic and other foulants minimize the loss of water from the process stream and do not require the addition of chemical to the process stream to assist in the removal of these foulants. In the embodiment shown in FIG. 1B, hardness is removed by the use of an IX softening step 114 that is described in detail below. The second of the two major stages, the High Pressure RO Stage 120 involves the passing of the pretreated process stream as the feed water through a series of steps involving RO systems. In one embodiment step 120 comprises passing the feed water through step 123 which comprises a high-pressure RO system process. The absence of foulants and hardness together with the presence of the antiscalant and the high pressure, enables this high pressure RO system process 123 to create a permeate stream without the scaling typically found in the RO systems of other solutions operating on feed water with similar characteristics. The permeate stream from step 123 is forwarded to be the recovery step 124 where the low solute recovered water is stored or otherwise utilized. The reject stream from step 123 is a high solute waste stream that may be further treated to reclaim elements.

When other steps are added within and around these two major stages, the result is a method that can recover significantly higher quantities of water from the water source than other processes. Tests have shown that this method can recover more than 90% of the water, by volume, of the source stream volume. The increased water recovery also provides the benefit of reduced waste. For purposes of this description, recovered water is defined as water with a lowered solute concentration than the source stream. The methods of this embodiment are accomplished without alkalinity removal and without acid or caustic addition to the process on a continuous basis.

Another embodiment of the method is described below utilizing the embodiment shown in FIG. 2.

Depending on the characteristics of the water, various steps in the process may be removed, resequenced or otherwise modified while still embodying the disclosed invention. Some of these alternative embodiments, although not all, are illustrated further in FIGS. 3A-3F.

Figure 2:
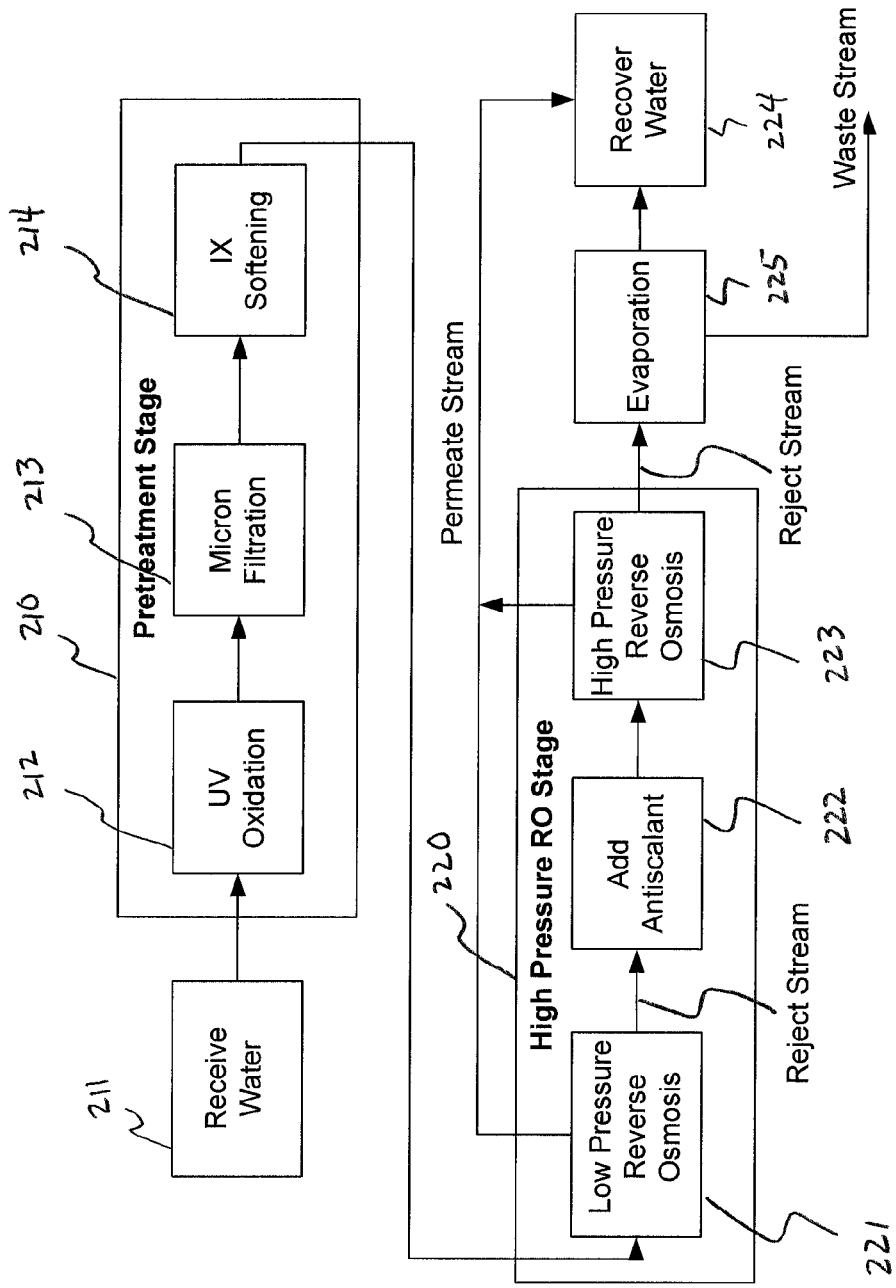
FIG. 2 shows a process flow diagram of one embodiment of the invention illustrating the use of one sequence of multiple steps in the Pretreatment Stage and the addition of an evaporation step.

One Embodiment of the Pretreatment Stage:

As shown in FIG. 2, the first stage of another embodiment of this method, the Pretreatment Stage 210, removes many of the foulants and hardness from the water source that typically causes fouling in downstream RO system membranes of this process. As described above, it is understood that if the water source already has a sufficient reduction of foulants and hardness, the Pretreatment Stage 210 may not be necessary in this process. When foulants and hardness are present, this first stage can involve multiple steps that can be performed in any order. The output of this Pretreatment Stage 210 is a process stream output with a silt density index generally less than 3.0 and a low level of hardness and polyvalent cations that cause hardness as described earlier.

The purpose of the Pretreatment Stage 210 is to provide a process stream with the characteristics desired as a feed water into the following High Pressure RO Stage 220. Therefore, depending on the characteristics of the water source, it is understood that these steps may be performed alone, in any combination and in any order. In one embodiment shown in FIG. 2, the Pretreatment Stage 210 of the process comprises three steps of UV oxidation 212, micron filtration 213 and ion-exchange 214 performed in the following order.

Referring to FIG. 2, after receiving the water 211 as a water source stream, the UV oxidation step 212 of this Pretreatment Stage 210 mitigates the potential for bacterial growth and colonization caused by these foulants. This step is typically but not necessarily used with ground water sources that contain bacteria. UV oxidation 212 can be accomplished via ultraviolet light (UV). UV in the wavelength range of 180-325 nanometer (nm) is an example of an effective disinfection technology for the destruction of micro-organisms. The UV light is applied to the water source or process stream through UV lamps that are positioned in a manner such that the water process stream is exposed to the UV light. As the process stream flows past the UV source, the microorganisms are exposed to the UV light which alters the DNA material in cells so that bacteria, viruses, molds, algae and other microorganisms can no longer reproduce. The microorganisms are considered dead, and the risk of disease from them is significantly reduced. This UV oxidation step 212 removes one potential foulant of the downstream RO system membrane. The use of UV oxidation for disinfection as opposed to oxidizing chemicals such as chlorine eliminates the need for the addition of chemicals to destroy the oxidant prior to the downstream RO systems. Also, UV oxidation does not create halogenated by-products if organics are present in the water source.

The UV oxidation step 212 may not be needed in the Pretreatment Stage 210 if the source water does not contain significant concentrations of microorganisms that may pose a substantial risk for membrane fouling.

The next step of this Pretreatment Stage 210 is micron filtration 213 that reduces the micro-colloidal material that can also cause fouling and scaling with the water recovery process. Scaling occurring in RO system processes refers to the deposition of "hard scale" on the RO membrane due to the solubility of sparingly soluble salts or silica being exceeded. Fouling refers to both scaling as well as the deposit of various materials such as organics and particulates and occurs in all membrane filtration processes.

This micron filtration step 213 removes colloidal and insoluble organic, inorganic and biologic foulants. Effective filtration of these particles can be accomplished through one to five micron, non-regenerable filter units or regenerable membrane micron filtration units, typically referred to as ultrafiltration (UF) or microfiltration (MF) systems that utilize membranes with sub-micron pore sizes. The use of near-absolute, non-regenerable filtration helps increase the recovery of water from the water source.

The removal of micro-colloidal material is helpful because a high recovery RO system membrane separates ionic solutes from the water source and concentrates them simultaneously as the membrane selectively removes water molecules preferentially over ionic solutes. Small amounts of precipitates or colloids in the RO system can become sites for more precipitates to form. If ionic solutes and silica are present in the water source under the high concentrations expected at high water recovery, it could form metal co-precipitates, insoluble silicates and/or polymerize more quickly around a nucleus of colloidal or precipitated material. Thus, micron filtration or ultra filtration units remove scale forming precipitates, colloidal and organic material which would operate to foul the RO system membrane.

Micron filtration 213 can be performed with any type of physical filter or membrane capable of removing micro-colloidal materials. However, the use of cartridge based micron filtration units in one embodiment has the added advantage that fouled cartridges can be easily replaced without the liquid waste produced by a membrane filter regeneration process.

If the use of membrane micron filtration or ultra filtration is required, these membranes will need to be backwashed and the overall recovery of the treated stream may be reduced by the volume of the waste stream generated by the backwash in this type of a micron filtration step.

The micron filtration step 213 may not be needed in the Pretreatment Stage if the level of colloids, when measured by the silt density index method is less than 3.0.

In order to further reduce the potential for the scaling, removal of cations that form sparingly soluble compounds that are present is performed by ion exchange (IX) softening step 214. Certain common cation and anion solutes found in ground water sources, when concentrated by the RO system membrane process, will precipitate if their ion solubility product (Ksp), is exceeded. Usually the sulfate and carbonate compounds of calcium, magnesium, and various other polyvalent metal cations, such as iron and aluminum, will be present in sufficient concentrations to present a precipitation problem for reverse osmosis membrane systems when operating at high recovery. IX softening 214 removes hardness created by polyvalent cations by, preferably, a weak acid cation (WAC) ion exchange resin or, alternatively, a conventional strong acid cation (SAC) ion exchange resin or a combination of the two resins. Weak acid resins are preferred due to their high capacity for polyvalent cations, stoichiometric regeneration efficiencies and ability to reduce hardness ions to less than 5 mg/L as $CaCO_3$. Weak acid resins can be operated in either the hydrogen or sodium form.

In some instances, especially when the water contains high hardness, a SAC ion exchange resin may be used in the IX softening 214 step to remove the major portion of the polyvalent cations. The SAC resin may be used alone or as a more cost-effective hardness removal step ahead of a WAC resin. An example of a flow diagram utilizing a SAC resin ahead of a WAC resin is shown in FIG. 3D.

The choice of SAC, WAC or a combination of SAC/WAC resin technologies in this treatment process step depends on the level of hardness and alkalinity in the water source. The purpose of this IX softening step 214 is to reduce the total hardness, as defined earlier, in the brackish process stream to very low hardness levels (typically less than 5 mg/L as $CaCO_3$ equivalent).

When the weak acid cation (WAC) ion exchange resin becomes loaded with cations, it is regenerated near stoichiometrically using a solution of dilute hydrochloric or sulfuric acid. If the process stream contains less hardness than alkalinity, the resin must be placed (or partially placed) in the sodium form. This is accomplished by following the acid regeneration step with a caustic regeneration step. Because of the stoichiometric regeneration efficiency of the WAC resin, the resulting regenerated brine contains mostly hardness ions and can be beneficially reused by re-injecting the brine into the RO permeate stream to increase the hardness and/or sodium adsorption ratio (SAR). This becomes important when the product water is applied to land or used for irrigation. Alternatively, the WAC regenerate solution can be routed to an evaporation system, pond or disposed of outside of the treatment process.

When the SAC resin becomes loaded, it is regenerated with a 10% salt solution (generally sodium chloride). This brine will be formulated by using commercially available salt. The brine regenerant, which now contains hardness cations and salt, is either routed to an evaporation system or pond or disposed of outside of the treatment process.

Figure 3A:
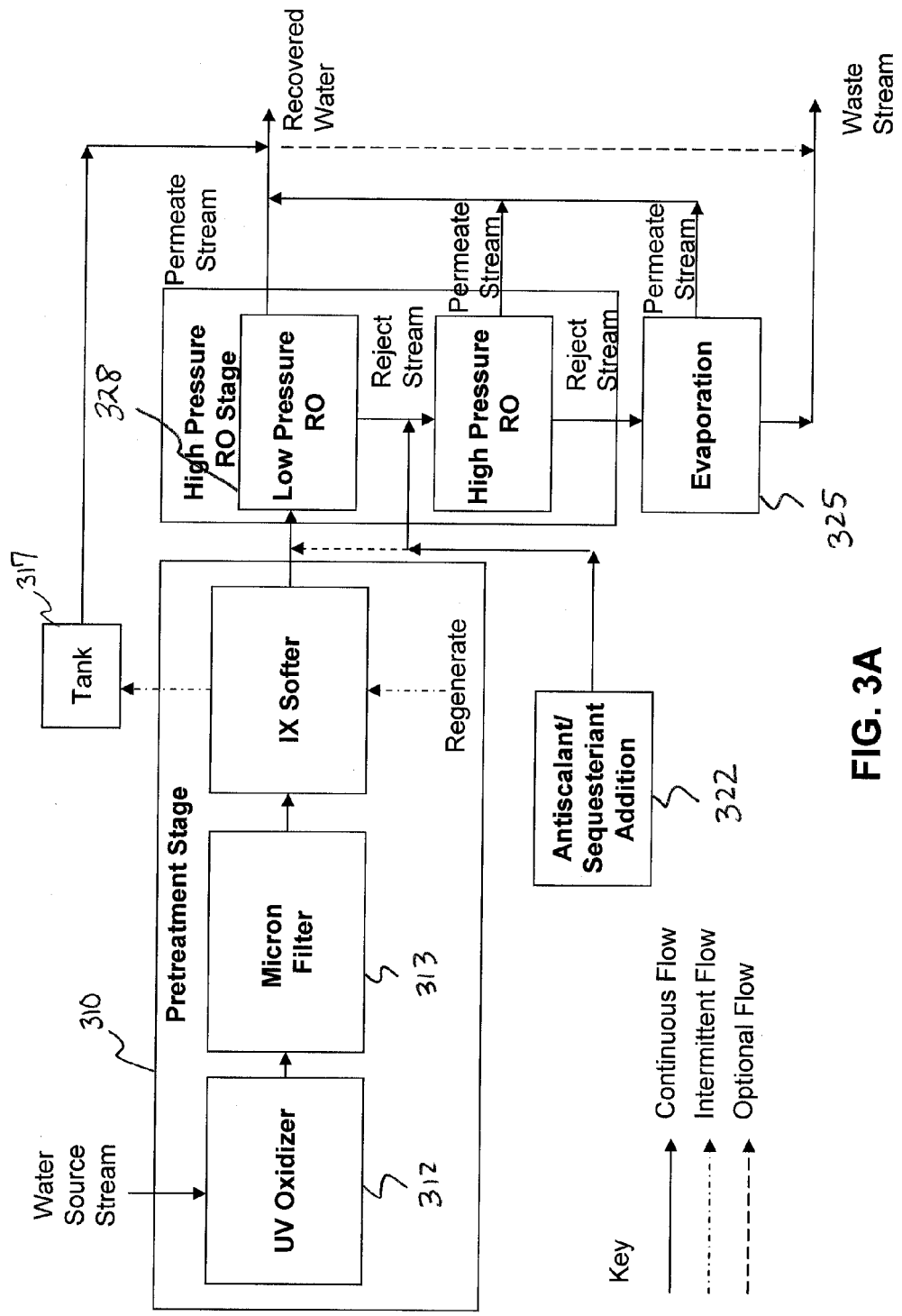
FIG. 3A shows a process flow diagram of one embodiment of the invention detailing flows and the regeneration process for the IX softening step.

The regeneration process is illustrated in FIG. 3A and shows the additional benefit of this invention in that the regenerant may also be used as input into the recovered water.

The IX softening step 214 may not be needed in the Pretreatment Stage 210 if the source water has a hardness less than 5 mg/L as $CaCO_3$.

The result of this Pretreatment Stage 210 is a process stream output with a silt density index less than 3.0 and water low in polyvalent cations.

One Embodiment of the High Pressure RO Stage:

One embodiment of the second stage, the High Pressure RO Stage is shown in FIG. 2. The characteristics of the process stream feeding this High Pressure RO Stage 220 is a feed water with significantly reduced hardness, colloids and bacteria. If these characteristics exist in the water source, or at other places in the process stream, that water may be used as the feed water to the High Pressure RO Stage 220 at that point of the process. Normally, the High Pressure RO Stage 220 comprises both a high pressure 223 and a low pressure RO step 221. It is understood that the feed water feeding this High Pressure RO Stage 220 could have characteristics that would eliminate the need for the first, low pressure RO step 221. For example, if the dissolved salt concentration is already high, then this step may be eliminated and only the high pressure RO step 223 is necessary. For purposes of this description, an embodiment will be described that comprises both a low pressure RO step and a high pressure RO step that includes pretreating the reject stream from the first RO step with an antiscalant.

Referring to FIG. 2, the first step of the High Pressure RO Stage 220, the low pressure RO step 221 comprises passing the process stream from the first Pretreatment Stage 210 as a first feed water to a conventional brackish RO system. This low pressure RO system utilizes brackish RO membrane technology and generally operates at rates of up to 90% water recovery from the process stream. Unlike most conventional brackish water RO systems however, in the invention proposed herein, the RO system will treat feed water that requires no acid adjustment and contains no scale inhibitor. Also, unlike other RO processes, there is no pH adjustment or de-carbonation of the process stream providing the feed water to the RO system in this embodiment of the invention. This low pressure RO system step 221 separates the first feed water into two streams; a permeate stream and a reject stream. In this embodiment, the low pressure RO permeate stream is conveyed to a water recovery process 224 where it is mixed with other product streams and stabilized for discharge out of the system and use. The low pressure RO reject stream is conveyed as the feed water to another high pressure RO system step 223 for further recovery.

The low pressure RO step 221 comprises a RO purification system common in the water purification industry in which a feed water is pumped against a semi-permeable membrane under pressure. Low pressure membranes are defined as those that are tested at manufacturer's test conditions at less than 400 psi. The membrane allows treated water to pass through to the permeate stream while rejecting the impurities, both suspended and dissolved into the reject stream. This low pressure RO system membrane used in this invention method may be utilized in various configurations. As an example, and not as a limitation, it is possible to use nanofilters or a composite membrane in a plate-and-frame or a spiral wound configuration.

As mentioned above, the need for the low pressure RO step 221 depends on the concentration of total dissolved solids (TDS) in the feed water to the RO system. If the TDS concentration of the process stream is greater than approximately 8,000 mg/L, then the low-pressure, brackish water RO system is generally not required. There are many instances when the process stream may already contain high TDS. For example, high TDS water sources may occur naturally, or be generated in by a production process or result from other water treatment processes, such as an existing brackish water RO system or evaporator.

Figure 3B:
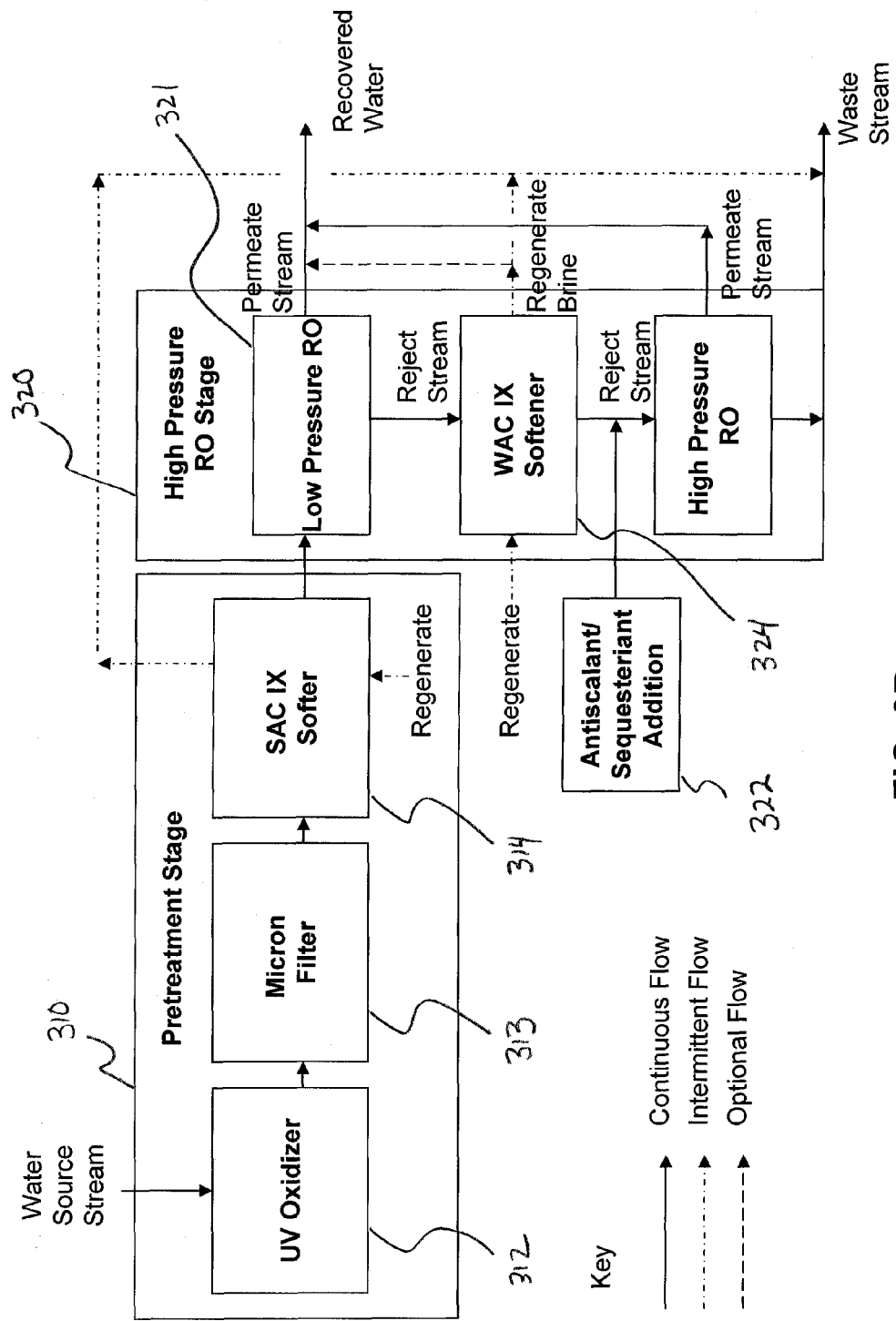
FIG. 3B shows a process flow diagram of one embodiment of the invention addressing high hardness and low Total Dissolved Solids (TDS) source water.
Figure 3C:
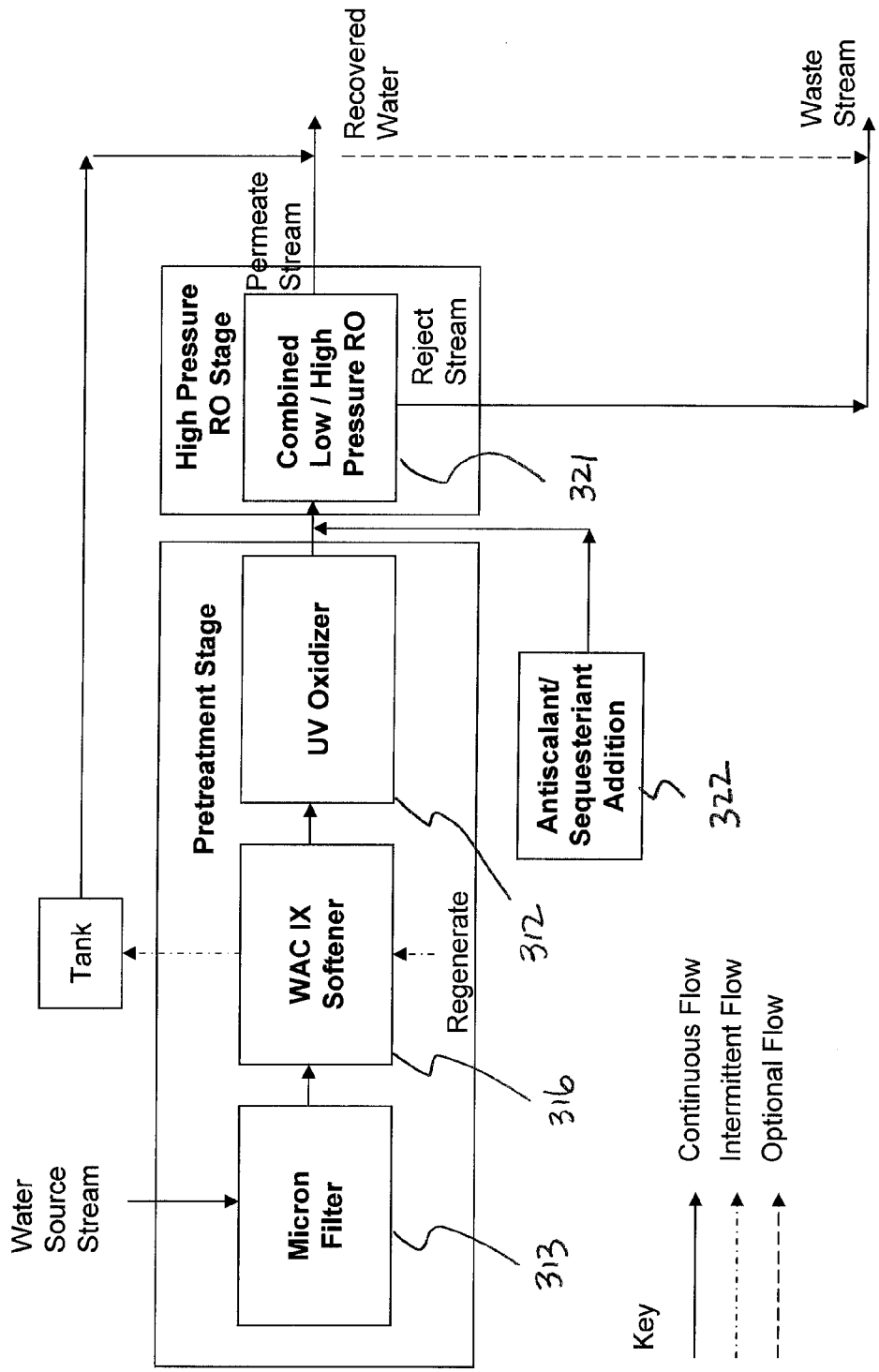
FIG. 3C shows a process flow diagram of one embodiment of the invention addressing medium to low hardness and low TDS source water.
Figure 3D:
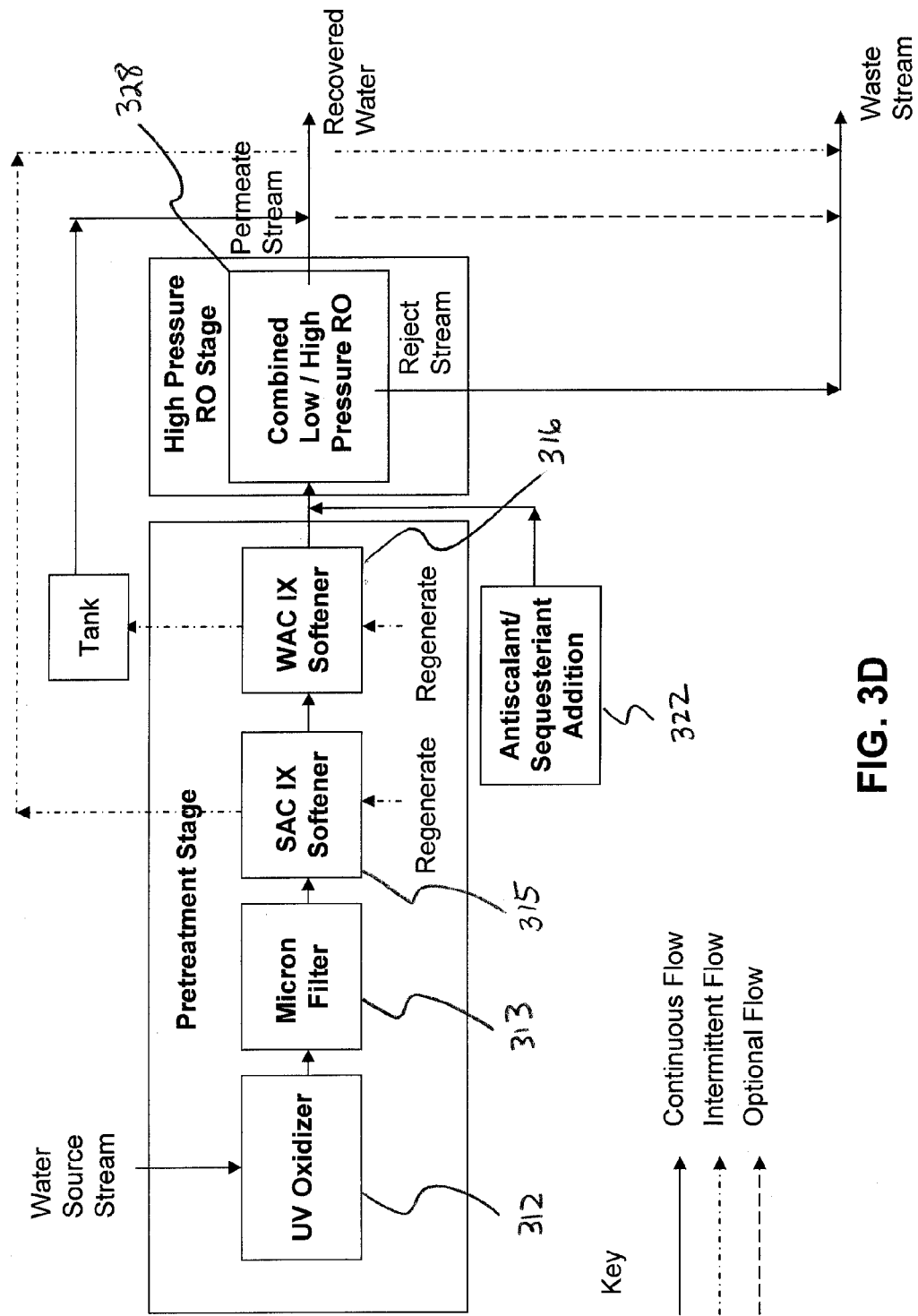
FIG. 3D shows a process flow diagram of one embodiment of the invention addressing high hardness and low TDS source water.
Figure 3E:
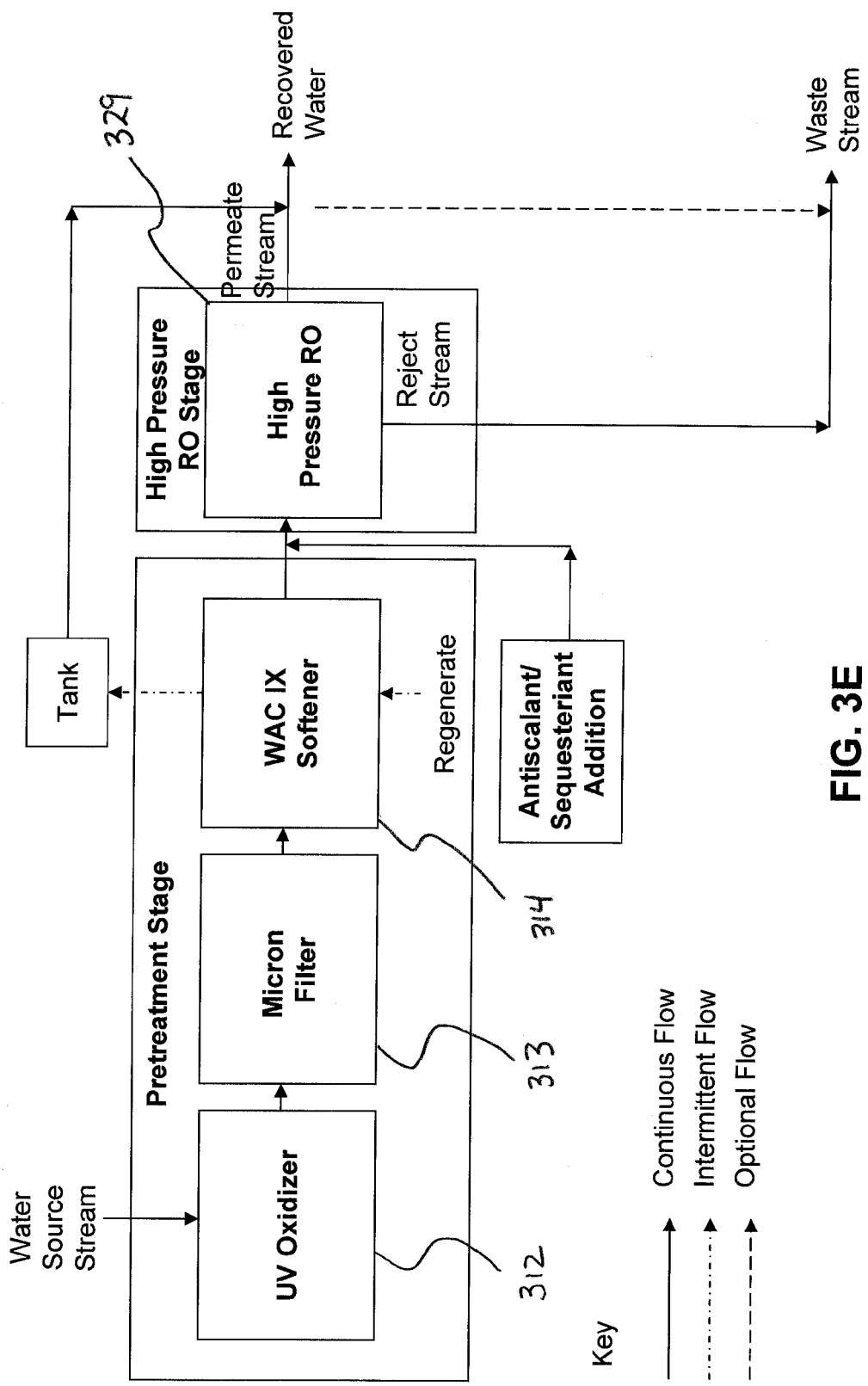
FIG. 3E shows a process flow diagram of one embodiment of the invention addressing medium to low hardness and high TDS source water.
Figure 3F:
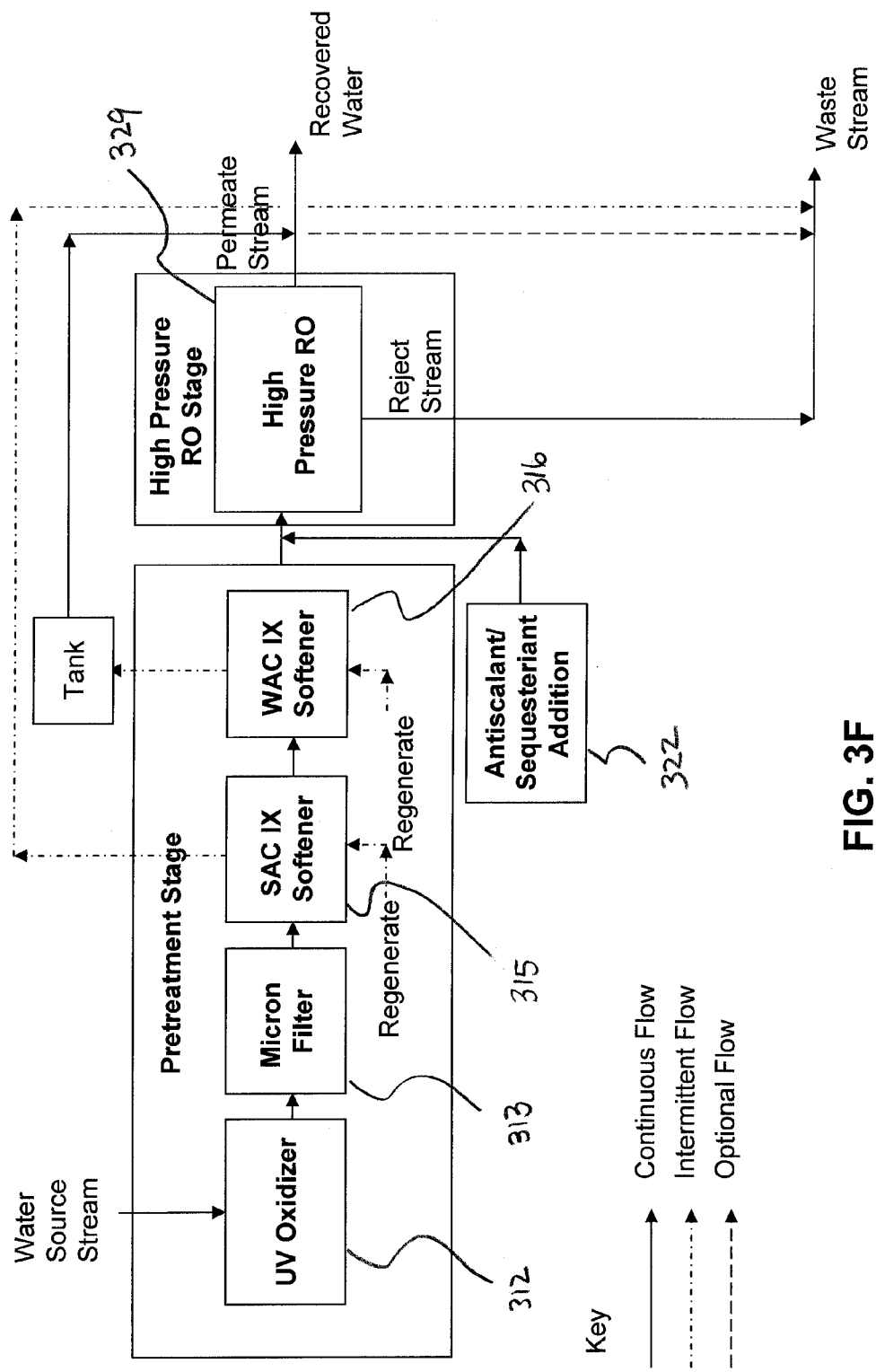
FIG. 3F shows a process flow diagram of one embodiment of the invention addressing high hardness and high TDS source water.

Examples of embodiments of this invention without the low pressure RO system are shown in FIG. 3E and FIG. 3F.

In some cases, the low pressure RO reject water may be injected with an antiscalant and/or sequestering agent ahead of the high pressure RO system to minimize the potential for scaling of the membranes from sparingly soluble salts (e.g., calcium carbonate) and silica.

As shown in FIG. 2, the step of adding antiscalant 222 comprises the addition of approximately one to ten parts per million of a specialized antiscalant polymer with the RO reject stream from the first RO system. The antiscalant is a material that retards the precipitation or polymerization of silica so that it can exceed its solubility as the process stream moves through the recovery process.

In some cases, the need for an antiscalant may be eliminated if it can be demonstrated that the antiscalant is not needed to keep silica from scaling the membranes. This may occur when the water chemistry is such that silica is naturally stabilized or sequestered in solution by ionic compounds, such as sodium bicarbonate.

The high pressure RO step 223 of the High Pressure RO Stage 220 pressurizes the reject stream of the low pressure RO step 221 with the antiscalant through a second, high pressure RO system so that greater than 80% of the reject stream from the low pressure RO system step 221 is recovered or until the silica auto-polymerizes within the process stream. The water recovery of the second RO system is ultimately limited by the average osmotic pressure of the RO system, the RO membrane operating pressure limitations and/or by the uninitiated polymerization levels of silica. It has been determined through testing and analysis, that embodiments of this invention are expect to achieve concentration levels approaching or exceeding ten times the solubility levels of silica. The permeate stream from the high pressure RO system step 223 is conveyed to a water recovery process 224 where it is combined with the first RO system's permeate for discharge out of the system for storage or use.

Because only the reject stream from the first RO system is subjected to the pressurized RO system in this embodiment, the increased cost of pressurizing and operating the second RO system is minimized.

The water recovery step 224 comprises the collection and distribution of treated water for storage or use.

As shown in FIG. 2, to further reduce the waste stream volume, one embodiment of the invention includes treating the final reject stream from the high pressure RO system with an evaporation step 225. This step further reduces the volume of the reject from the second RO system, sometimes reducing the volume by at least one half. Distillate from the evaporation step 225 is passed to the water recovery step 224. The resulting waste stream, representing as little as 1% of the initial source water received into the system, is discharged from the treatment process. The reject stream entering this evaporator step 225 is typically in the range of 5% to 12% by weight salt, and is predominantly the sodium salts of chloride, sulfates and/or bicarbonates. In the evaporator discharge, these salts approach 30% by weight, and can be directed to a pond or crystallizer for dry salt production. The resulting waste may be landfilled or beneficially re-used as a valuable byproduct.

In summary, therefore, embodiments of this proposed invention define a method that can recover significant amounts of water from the water source and accomplishes this high recovery with no alkalinity removal and no acid or caustic addition to the process stream on a continuous basis. For commonly encountered water sources such as, but not limited to oil and gas filed produced water and brackish ground or surface water, the rate of water recovered can exceed 90%. Brackish ground water is generally ground water with TDS in the range of 500 to 20,000 mg/L. Embodiments of the process use in-line physical and physio-chemical treatment methods to remove any potential biological, colloidal and hardness foulants continually so that there is minimal loss of water from the water source and minimal addition of chemicals to accomplish removal or reduction of these potential recovery-limiting foulants.

Figure 4:
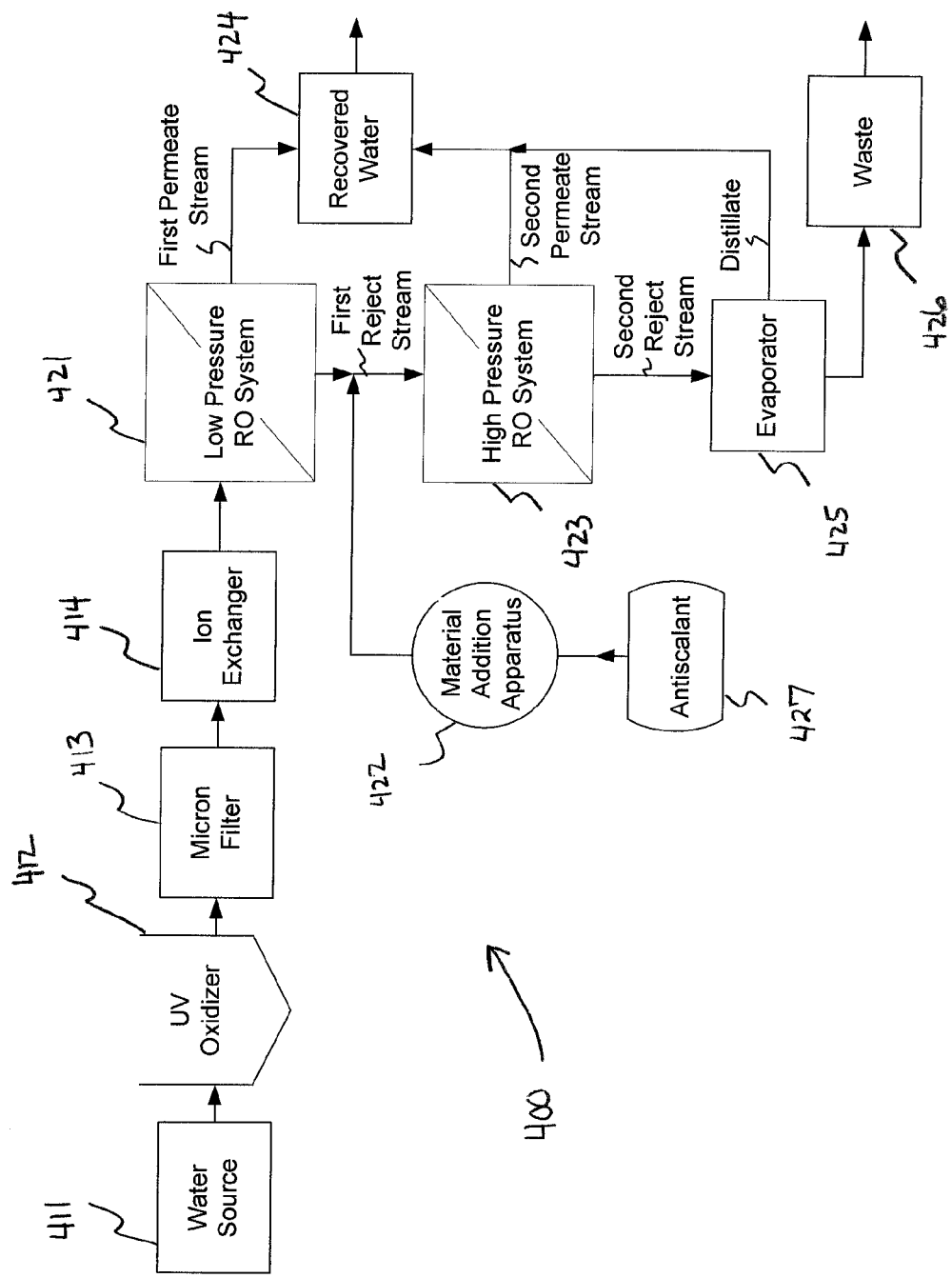
FIG. 4 shows a system diagram for one embodiment of the apparatus of this invention.

One Embodiment of the Apparatus:

The methods of this invention, as described earlier, can be implemented through an apparatus as described below. One embodiment of the water recovery apparatus is shown in FIG. 4 where the water recovery apparatus 400 represents a collection of equipment connected in a manner that allows a stream from a water source to be received and passed between the equipment as the flow of a process stream. At the conclusion of the water recovery process, recovered water and waste are produced. Just as the earlier described methods of this invention allow for the reordering, removal and modification of method steps, the apparatus can function with the reordering, removal and modification of the systems that implement those steps. For illustration purposes, and not for limitation, the apparatus will be described utilizing the two stages and multiple steps described above. Specifically, the apparatus will be described to be consistent with the embodiment of the method illustrated in FIG. 2. Furthermore, the recitation of specific part numbers and component suppliers as described herein are for example purposes only, and shall not limit the scope of the invention in any manner.

Referring to the embodiment in FIG. 4, water is received by and passed within the water recovery apparatus 400 utilizing piping, plumbing, pumps, tanks, conduits, canals, culverts and other water treatment and transportation equipment that is well known to one in the art of water treatment. In one embodiment, the lines and conduits to be used in the system consist of 0.5-12 inch diameter PVC conduits manufactured by Spear Manufacturing Co. of Sylmar, Calif. or similar conduits made of metal (e.g. stainless steel). Stainless steel and other metallic piping is also contemplated. Likewise, valves used in the system may consist of metallic, plastic and standard PVC motorized ball valves manufactured by Hayward Industrial Products, Inc. of Elizabeth, N.J. or other comparable valves known in the art. Holding tanks and other pieces of equipments to hold, store and otherwise ensure the proper flow of the process stream and apparatus supplies are also anticipated as being utilized and present in this apparatus. However, it should be noted that specific structural components (e.g. valves, lines, tanks and the like) used to implement the processes characterized herein may be suitably varied depending on the desired size and pressure requirements of the system, and the present invention shall not be exclusively limited to the illustrated embodiment and components identified as example components.

As discussed above in the methods of embodiments of the invention, the means to ensure the proper characteristics of the feed water into the RO systems can include, but are not limited to direct measuring systems of the feed stream or through knowledge of the feed water characteristics from treatment processes the water has been subjected to. Measuring equipment of this type includes, but is not limited to, equipment and kits such as common hardness monitors, pH monitors, SDI monitors, TDS monitors, total oxidizable carbon (TOC) monitors, conductivity monitors and other common water treatment equipment and sensors to monitor the characteristics of a water stream. It is also contemplated that the inclusion of treatment or pretreatment equipment into this apparatus, such as described herein, can create and therefore ensure feed water with the proper characteristics. In the embodiment described below, the characteristics of the feed water are ensured through the pretreatment of the water source stream using a combination of the pretreatment equipment described below.

Referring to FIG. 4, water from the water source 411 is passed to a UV oxidizer. For the UV oxidizer 412, the UV light source may be any ultraviolet lamp source that generates ultraviolet emission. This can include, but should not be limited to a low pressure mercury lamp. The light source must be packaged in a manner that allows the light source to be exposed to the process stream, or water source stream, from the water source. An example of one embodiment of the UV oxidizer 412 includes a 12 GPM (UV) ULTRAVIOLET DISINFECTION SYSTEM, Model: UV-S-12-Q sold by RainDance Water Systems of P.O. Box 2312 Ramona, Calif. and the Enaqua XUV System, manufactured and sold by Enaqua, Inc., 2446 Cades Way, Vista, Calif. Other embodiments of UV light sources capable of applying UV in the wavelength range generally of 180-325 nanometer (nm) are contemplated.

The disinfected process stream from the UV oxidizer 412 is passed to the micron filter 413. For illustration purposes, and not for limitation, an example of micron filtration equipment that is suitable for use in the invention is the Model 740B Series micron cartridge filters manufactured by 3M Company, Minneapolis, Minn. These cartridges are housed in the Tri-Plex cartridge filter housing. An example of a microfiltration (MF) or ultrafiltration (UF) unit that can be employed is the pressurized system based on the Norit XIGA membrane filters, 1330 Anvil Dr, Rockford, Ill. 61115, or the Siemens Memcor L10V or L20V membrane filters, 600 Arrasmith Trail, Ames, Iowa 50010, or the Pall Corporation membrane filtration system, 839 NYS Route 13, Courtland, N.Y. 13045. Another suitable micron filter implementation is the Amiad $AMF^2$ microfiber filter offered for sale by Amiad Filtration Systems, 2220 Celsius Avenue, Unit B, Oxnard, Calif. 93030. As an option to pressurized micron filtration systems, a vacuum driven membrane system such as the GE Zeeweed 1000, manufactured by GE subsidiary Zenon, 3239 Dundas St. West, Oakville, ON L6M 4B2 Canada, can be employed to provide the necessary removal of fine colloidal material when present in the water source.

The filtered process stream for the micron filter 413 is then passed to the ion exchanger 414. For illustration purposes, and not for limitation, examples of strong acid cation (SAC) exchange resins used to remove polyvalent cations from solution include Purolite C100, Dowex Marathon C and Rohm & Haas IRC 1200Na. The resin is contained in a tank or other container suitable for efficiently contacting water to remove polyvalent cations and load them onto the resin. When the resin is loaded, the equipment includes a means for regenerating the resin by contacting the resin with a salt solution (e.g, sodium chloride) to remove the loaded polyvalent ions to first form a waste brine stream consisting of hardness ions and a sodium regenerated resin for reuse. Examples of manufacturers of suitable strong ion exchange resin systems include Anderson Water Systems (Dundas, Ontario) and Integrated Separation Solutions, LLC. (Madison, Wis.). Examples of weak acid cation (SAC) exchange resins used to remove polyvalent cations from solution include Purolite C105E, Dowex MAC-3 and Rohm & Haas IRC 86. The resin is contained in a tank or other container suitable for efficiently contacting water to remove polyvalent cations and load them onto the resin. When the resin is loaded, the equipment includes a means for regenerating the resin by contacting the resin with a dilute acid solution (e.g., hydrochloric acid) to remove the loaded polyvalent ions to first form a waste brine stream consisting of hardness ions a hydrogen regenerated resin for reuse. Examples of manufacturers of weak ion exchange resin systems include Anderson Water Systems (Dundas, Ontario) and Integrated Separation Solutions, LLC. (Madison, Wis.).

The process stream from the ion exchanger 414 is then passed as the feed water to the High Pressure RO Stage, which in the embodiment shown in FIG. 4, starts with the low pressure RO system 421. The RO system 421 is a water purification process in which water is pumped against a semipermeable membrane under pressure. The membrane allows product water to pass through to a permeate stream while rejecting the impurities, both suspended and dissolved into a reject stream. The feed water flows parallel to the semipermeable membrane with a fraction of it passing through a given membrane area; dissolved ionic and organic solutes are largely rejected by the membrane. As an example, and not to be limiting, one embodiment of a low pressure RO membrane is a Filmtec, crosslinked, interfacially polymerized, aromatic polyamide membrane. Membranes of this type are described in U.S. Pat. No. 4,277,344, John I. Cadotte, Filed Feb. 22, 1979, which is incorporated herein by reference. For illustration purposes, and not for limitation, examples of low pressure reverse osmosis (RO) membranes that can be used in the invention are the crosslinked, interfacially polymerized polyamides membranes manufactured by Dow Chemical under the trademark name Filmtec, 5400 Dewey Hill Rd., Edina, Minn. 55439, and the similar products manufactured by Toray Industries 12140 Community Rd., Suite B, Poway, Calif. 92064, and the ESPA brand manufactured by Hydranautics, a subsidiary of Nitto Denko, 401 Jones Rd, Oceanside, Calif. 92054. Low pressure membranes are defined as those that are tested at manufacturer's test conditions at less than 400 psi. These membranes are housed in reinforced pressure vessels. For illustration purposes, and not for limitation purposes, suitable pressure vessels include fiberglass pressure vessels such as those manufactured by Protec, a subsidiary of Baekart Composites and located at 2455 Ash, St., Vista, Calif. 92081, or by Codeline Pressure Vessels. In some embodiments, the pressure vessels are assembled on a skid with the interconnecting piping made of stainless steel and polyvinylchloride (PVC) where appropriate for the pressures in the system. Feed pumps to pressurize the feed water to the RO membranes can be installed on this skid or mounted separately. Instrumentation to monitor the flows, pressures and conductivities of the streams are monitored by a process computer. Energy recovery devices can also be employed to minimize the energy usage of the RO system, then the equipment supplied by Energy Recovery, Inc, 1908 Doolittle Dr., San Leandro, Calif. 94577 is one example of equipment that can be employed for this purpose.

In this embodiment, the reject stream from the low pressure RO system 421 is injected with an antiscalant 427 through the use of a material addition apparatus 422. The antiscalant 427 is a silica inhibitor that retards the polymerization of silica and allows it to exceed its solubility. For illustration purposes, and not for limitation, an example antiscalant that can be used in one embodiment of the invention is the Spectra-Guard SC, manufactured by Professional Water Technologies, 4151 Avenida de la Plata, Oceanside, Calif. 92056 diluted in an 11:1 ratio for dosing rates in the range of 1 to 10 parts-per million (PPM). Another typical example of an antiscalant 427 that can be used in the invention to chelate hardness ions and metals is Versene 100, which is manufactured by Dow Chemical. The use of other antiscalants is also contemplated.

The reject stream from the low pressure RO system 421 is received by the high pressure RO system 423. The high pressure RO system 423 used in this embodiment of the invention is common and well known in the art. For illustration purposes and not for limitation, an example of a suitable high pressure RO membrane system would use membranes designed and tested by the manufacturer for a 400 psi transmembrane pressure. These membranes are typically used in seawater desalination applications. They are similar to the cross-linked, interfacially polymerized polyamide membranes described as part of the low pressure RO system 421 except that they contain a more rigid permeate carrier material to withstand the higher process pressures. The Hydranautics SWC-series, the Dow/Filmtec SW30-series and the Toray TM820-series membranes are examples of, but not limiting examples of some of the membrane types that are suitable for this system. These membranes are housed in high-pressure versions of reinforced fiberglass pressure vessels. For illustration purposes, and not for limitation, pressure vessels such as those manufactured by Protec and Codeline can be used in a similar manner as the low pressure RO membrane housings. The pressure vessels can be assembled on a skid or other platform with pumps and interconnecting piping of a pressure rating suitable for the high pressure within this system. These components are common materials available from many suppliers and are well-known in the art. The pumping system for the high pressure RO system 423 typically consists of multiple pumps or pump systems. In a two pump system, a first pump feeds the first stage vessels and an inter-stage boost pump that feeds the second stage vessels. Several models of pumps can be used in the invention. For illustration purposes, and not for limitation, examples of suitable pumps include centrifugal pumps manufactured by Grundfos, Flowserve and Union are suitable and positive displacement pumps manufactured by Wheatly are also suitable. The specific model of pump depends on the flow rates for the specific application. Controls and valves used in the high pressure RO system 423 are also similar to low pressure RO systems described previously. In this embodiment, the high pressure system 423 passes a reject stream to an evaporator system 425 and passes recovered water to a recovered water retainer 424 or other system to recover and/or reuse the treated water.

The reject stream from the high pressure RO system 423 is passed to the evaporator 425 to further recover water and reduce the level of waster. Any evaporator system common in the water recovery industry is appropriate. For illustration purposes, and not for limitation, an example of suitable evaporator equipment for this application is a double-effect evaporator, such as the WasteSaver Model manufactured by SAMSCO. Waste from the evaporator system 425 is passed to a waste retainer 426 or other method of recovering the waste. Distillate from the evaporator 425 is passed to the recovered water retainer 424 or other system to recover and/or reuse the recovered water.

Operational Example of One Embodiment of the Method:

Referring to FIG. 2, the following is a description of the operation of one embodiment of the disclosed system upon the water source and the process stream. FIG. 2 is used to illustrate one embodiment of the invention however it is recognized, as it is described earlier in the specification, the steps can be performed in different sequences with one or more of the steps missing.

A typical water source that is received in step 111, but not to limit the types of water source that can be treated by the disclosed invention, includes water drawn from underground reservoirs that contains one or more impurities such as dissolved salts, colloids, hardness and biological materials. The pH of the water is the naturally-occurring pH as is the temperature. There may be levels of bacteria and naturally-occurring organic mater. With typical water sources, there may be levels of bacteria that need to be inactivated and colloidal matter that has to be removed prior to concentrating the process stream and separating the ionic constituents. Some water sources may contain naturally-occurring organic matter at levels that will necessitate removal prior to the RO units. This water source is received as a water source stream in step 211 and passed to the UV oxidation step 212.

UV oxidation 212 is applied to the water source stream when bacterial levels in the water source stream need to inactivated. The characteristic of the water output from this step is the same as the water source stream with the exception that there is no bacterial activity. There is typically no loss of water volume in the process stream resulting from this step. The water coming from the UV oxidation 212 is passed as the process stream to micron filtration 213.

The micron filtration step 213 removes colloidal materials when present in the process stream. The colloids are retained in the filter elements of a cartridge filtration device or a membrane filtration system (UF or MF system). Therefore, the process stream is passed out of the micron filtration step 213 absent the colloidal materials retained in the filter. The loss of water volume in the process stream resulting from this step is minimal and typically occurs as filters are changed or cleaned. Having passed through both the UV oxidation step 212 and the micron filtration step 213, the process stream has reduced bacterial activity and reduced colloids.

The process stream for micron filtration step 213 is passed to the IX softening step 214 to remove divalent and polyvalent cations present in the process stream. The output of the IX softening step 214 is a process stream typically containing less than 5 mg/L total hardness as $CaCO_3$, when analyzed by industry standard methods defined by the American Water Works Association. Trace level polyvalent cations, such as barium, strontium, iron, and aluminum, will be present in the process stream after this micron filtration step 213 at near standard analytical detection levels. The loss of water volume from the process stream resulting from this step is minimal and only occurs if process stream water is used in the regeneration of the ion exchange resins.

In the embodiment illustrated in FIG. 2, the output of this Pretreatment Stage 210 is a process stream with no bacterial activity, reduced colloids and reduced hardness. Silica is still present as a solute in the process stream. This process stream is then fed as the feed water into the steps of the High Pressure RO Stage 220.

The low pressure RO step 221 step allows the feed water to pass through the RO membrane as the permeate stream while maintaining the silica in solution and passing the portion of feed water with increased concentrations of suspended silica and other ionic constituents off as the reject stream. The permeate stream in one embodiment represent approximately 85% of the volume of the original water source stream and generally contains solutes at concentrations less than 5% of the solute concentration of the feed water entering this low pressure RO step 221. In one embodiment, the reject stream contains the remaining 15% of the feed water volume with silica and other ionic constituents in concentrations at least 6 times the concentration when fed into step 221. The reject stream is passed to the add antiscalant step 222.

Adding the antiscalant in step 222 adds approximately one to ten parts per million of a specialized antiscalant polymer into the RO reject stream from the first RO system. This reject stream with antiscalant is passed as the feed water to the high pressure RO step 223.

The high pressure RO step 223 further separates silica from the feed water creating a permeate stream of recovered, low solute water. In one embodiment, this permeate stream represents approximately 85% of the volume of the feed water fed into this step. In one embodiment, the RO permeate stream output generally contains solutes at concentrations less than 5% of the feed water that entered this step and a reject stream that represents approximately 15% of the volume with 6 times the solute concentration of the feed water fed into step 223.

For some embodiments of the invention, at the conclusion of the High Pressure RO Stage 220, as much as 98% of the water source stream fed into this process has been recovered as a permeate stream with the characteristics of recovered, low solute water and as low as 2% of the source stream has been separated as a reject stream. Higher recovery rates smaller reject streams are also possible.

The evaporation step 225 further reduces the volume of the concentrated reject stream of the High Pressure RO Stage 220. The reject stream can be reduced by approximately 50% or more in some embodiments of the invention. The concentrated solute output from the evaporation step 225 is two to three times the concentrated reject from the high pressure RO step 223 and can be discharged to a facility for recovery such as dry salt production. The condensate output from this step can be combined with the permeate stream of the High Pressure RO Stage 220.

Other Embodiments of the Method and Apparatus:

Not for limitation, but for illustration, other embodiments of the methods and apparatus described above are shown in FIGS. 3A-3F. The illustrated embodiments are described as implementations of the apparatus, but they also illustrate alternative embodiments of the methods described above. Each of these figures has a key showing those process steps and system components that are capable of having a continuous, intermittent and optional flow between other steps and components.

As shown in FIG. 3A, one embodiment of the system includes an IX softener 314 as part of the Pretreatment Stage 310. The IX softener may be a SAC, WAC or a combined SAC and WAC system. The UV oxidizer 312, micron filter 313, antisclant/sequestreriant addition 322, low pressure RO 321 and evaporation 325 systems may also be included as illustrated but they are not required. The use of the tank 317 is to hold regenerate for addition of the recovered water.

FIG. 3B shows an embodiment including a SAC IX softener 315 as part of the Pretreatment Stage 310 and a WAC IX softener 324 as part of the High Pressure RO Stage 320. The UV oxidizer 312, micron filter 313, antisclant/sequestreriant addition 322 and low pressure RO system 321 may also be included as illustrated but they are not required. In this embodiment, the regenerant brine can be intermittently added to the permeate and waste stream.

As shown in FIG. 3C, one embodiment of the process includes a WAC IX softener 316 as part of the Pretreatment Stage 310. In this embodiment, the RO system 328 is a combined low pressure and high pressure RO system. The UV oxidizer 312, micron filter 313 and antisclant/sequestreriant addition equipment 322 may also be included as illustrated but they are not required. FIG. 3C also shows one alternative configuration of the sequence of steps and components of the Pretreatment Stage 310.

FIG. 3D shows an embodiment including both SAC 315 and WAC IX softener 316 and a combined low pressure and high pressure RO system 328. The UV oxidizer 312, micron filter 313 and antisclant/sequestreriant addition equipment 322 may also be included as illustrated but they are not required.

As shown in FIG. 3E, one embodiment of the process includes a WAC IX softener 316 as part of the Pretreatment Stage 310. In this embodiment, the RO system is a high pressure RO system 329. The UV oxidizer 312, micron filter 313 and antisclant/sequestreriant addition equipment 322 may also be included as illustrated but they are not required.

FIG. 3F shows an embodiment including both SAC 315 and WAC IX softener 316 and a high pressure RO system 329. The UV oxidizer 312, micron filter 313 and antisclant/seques-treriant addition equipment 322 may also be included as illustrated but they are not required.

Pilot Test of One Embodiment:

A pilot water treatment system was set up to test the efficacy of some embodiments of the methods disclosed. The pilot water treatment system successfully reduced the volume of a 1970 mg/L total dissolved solids (TDS) brackish water source by as much as 98%. No scaling was observed. The silica sequestriant utilized provided significant safety margin in time prior to observing the final reject beginning to exhibit signs of silica precipitation or polymerization. Details of the pilot water recovery methods and apparatus tested are described below.

A bench-scale test of two high recovery reverse osmosis (RO) options for treating coalbed natural gas (CBNG) produced water collected from gas fields. This water contains approximately 1,900 mg/L TDS, consisting mostly of sodium bicarbonate but also includes trace level constituents, including silica, hardness and other sparingly soluble salts (e.g., barium, strontium and iron).

The primary objectives of the bench-tests were to:
a. Determine the potential for membrane fouling to occur, primarily from silica.
b. Determine the maximum water recovery of the treatment process without observing membrane fouling. The target water recovery was 98%.
c. Evaluate the effectiveness of each option for meeting the Specific Conductivity (SC) and SAR discharge standards of 1,000 microsiemens/cm and 3.0, respectively.

Neutral pH Treatment Results:

For the bench-scale test, the following treatment steps were completed:
a. Raw water was softened through a weak acid cation (WAC) resin operated in the sodium form
b. The softened water was filtered through a one micron cartridge filter
c. The softened, filtered water was then treated to 85% recovery in a bench-scale RO test system
d. The reject from the low pressure RO system was then injected with 3.5 mg/L of an antiscalant and treated in the high pressure RO system to a final RO recovery of about 98%.

The results of this test are shown in FIG. 5 shown below.

Major Results from the Test:

Major results from this test are as follow:
a. A silt density index (SDI) of the raw feed water was found to be too high to measure (>5).
b. The WAC treatment step successfully reduced the hardness of the raw feed water to less than 1 mg/L as CaCO3.
c. After softening and cartridge filtration, the SDI of the RO feed water was reduced to less than 1.0.
d. The final water recovery from the RO process was determined to be 98% (by volume) at a final pressure of about 1,100 psig. Further recovery was limited by equipment limitation (could not safely exceed a pressure of 1,100 psig).
e. There was no evidence of membrane fouling throughout the process, including at 98% recovery, where the salt concentrations are about 50 times the feed concentration.
f. The silica concentration was difficult to measure in the final reject stream due to interference from the silica-specific scale inhibitor. Through mass balance calculations, the silica is likely in the 500 to 600 mg/L range rather than as shown in FIG. 5. This is supported by the fact that no silica was visually present either in the final reject stream or in the equipment once it was dismantled.

g. A sample of the final reject stream was collected and maintained at room temperature overnight. After approximately 12 to 14 hours, precipitate began to form in the sample bottle, indicating that the silica remained at supersaturated conditions for extended periods of time before finally precipitating from solution.

h. A sample of the final reject was also placed in an ice bath and left overnight. After being cooled, a significant volume of precipitate was formed at the bottom of the container. This is most likely sodium bicarbonate salts.

The overall results from this test successfully confirmed that 98% recovery is possible for this water source without membrane fouling from ions such as silica. A pilot test is planned to confirm these results in a continuous on-site process.

With respect to the above descriptions it is to be realized that the optimum relationships for the parts of the invention, to include variations in size, materials, shape, form, function and manner of operation, assembly, order and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact embodiment and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

We claim:

1. A method of removing elements from feed water comprising the steps of
   a) receiving feed water containing silica and hardness ions and at a natural pH of about 8.1,
   b) treating the feed water with a weak-acid cation-exchange resin to reduce the hardness to less than 1 mg/L, followed by
   c) treating with a 1 micron cartridge filter to reduce the SDI to less than 1.0,
   d) further treating the treated feed water to a low-pressure reverse osmosis (RO) process at about 85% recovery,
   e) injecting about 3.5 mg/L of a silica-specific antiscalant into the low-pressure RO reject stream,
   f) treating the antiscalant-injected low pressure RO reject stream in a high-pressure RO system to obtain a final recovery of greater than 90%, with the final RO reject stream containing super-saturated silica at about 4 times the saturation level of silica in water.

2. The process of claim 1 wherein the recovery in the final RO reject stream is about 98%.

* * * * *